United States Patent
Kato

(10) Patent No.: US 11,118,049 B2
(45) Date of Patent: *Sep. 14, 2021

(54) MODIFIER AND USE METHOD THEREOF, MODIFIER PRODUCTION METHOD AND CARRIER FOR ADDITIVE

(71) Applicant: TOYOTA BOSHOKU KABUSHIKI KAISHA, Aichi (JP)

(72) Inventor: Keisuke Kato, Kariya (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/480,026

(22) PCT Filed: Jan. 19, 2018

(86) PCT No.: PCT/JP2018/001681
§ 371 (c)(1),
(2) Date: Jul. 23, 2019

(87) PCT Pub. No.: WO2018/139378
PCT Pub. Date: Aug. 2, 2018

(65) Prior Publication Data
US 2019/0390053 A1    Dec. 26, 2019

(30) Foreign Application Priority Data
Jan. 30, 2017    (JP) .............................. JP2017-014821

(51) Int. Cl.
*C08L 53/00*    (2006.01)
*C08J 3/20*    (2006.01)
(Continued)

(52) U.S. Cl.
CPC ............... *C08L 53/00* (2013.01); *C08J 3/201* (2013.01); *C08J 3/226* (2013.01); *C08L 23/12* (2013.01);
(Continued)

(58) Field of Classification Search
CPC . C08J 3/226; C08L 2207/02; C08L 2205/035; C08L 2310/00; C08L 23/14; C08L 53/00
See application file for complete search history.

(56) References Cited

U.S. PATENT DOCUMENTS

| 5,202,380 A | 4/1993 | Ilenda et al. |
| 9,353,251 B2 | 5/2016 | Kito et al. |

(Continued)

FOREIGN PATENT DOCUMENTS

| EP | 2796496 A1 | 10/2014 |
| EP | 3428224 A1 | 1/2019 |

(Continued)

OTHER PUBLICATIONS

India Office Action, India Patent Office, Application No. 201917033507, dated Jun. 8, 2020.

(Continued)

*Primary Examiner* — Mark S Kaucher
(74) *Attorney, Agent, or Firm* — Greenblum & Bernstein, P.L.C.

(57) ABSTRACT

Disclosed is a modifier that is blended with a polyolefin to obtain a molded body and methods for using the same and for producing the modifier. The modifier includes a continuous phase (A) containing a second polyolefin resin and a dispersed phase (B) containing a polyamide resin and a modified elastomer and composed of a melt-kneaded product of the polyamide resin and the modified elastomer, the modified elastomer is an elastomer having a reactive group that reacts with the polyamide resin, the elastomer is an (Continued)

olefin-based thermoplastic elastomer having, as a skeleton, a copolymer of ethylene or propylene and an α-olefin having 3-8 carbon atoms or a styrene-based thermoplastic elastomer having a styrene skeleton, and when a total of the continuous phase (A) and the dispersed phase (B) is taken as 100% by mass, a content of the dispersed phase (B) is 80% by mass or less.

11 Claims, 1 Drawing Sheet

(51) Int. Cl.
  *C08J 3/22* (2006.01)
  *C08L 23/12* (2006.01)
(52) U.S. Cl.
  CPC ..... *C08L 2205/035* (2013.01); *C08L 2207/02* (2013.01); *C08L 2310/00* (2013.01)

(56) References Cited

U.S. PATENT DOCUMENTS

| | | | |
|---|---|---|---|
| 9,493,642 B2 | 11/2016 | Kito et al. | |
| 9,840,615 B2 | 12/2017 | Kito et al. | |
| 2005/0014900 A1 | 1/2005 | Park | |
| 2014/0364569 A1* | 12/2014 | Kito | C08L 23/02 525/183 |
| 2014/0371394 A1* | 12/2014 | Kito | C08L 77/02 525/184 |
| 2017/0029610 A1 | 2/2017 | Kito et al. | |
| 2018/0327551 A1 | 11/2018 | Kito et al. | |
| 2018/0334560 A1 | 11/2018 | Kito et al. | |
| 2019/0022903 A1 | 1/2019 | Kito et al. | |
| 2019/0100645 A1 | 4/2019 | Kito et al. | |
| 2020/0180535 A1 | 6/2020 | Kito et al. | |
| 2020/0216648 A1 | 7/2020 | Kato | |

FOREIGN PATENT DOCUMENTS

| | | |
|---|---|---|
| EP | 3438180 A1 | 2/2019 |
| EP | 3438182 A1 | 2/2019 |
| EP | 3572465 A1 | 11/2019 |
| JP | 04-202247 | 7/1992 |
| JP | 2013-147645 | 8/2013 |
| JP | 2013-147646 | 8/2013 |
| JP | 2013-147647 | 8/2013 |
| JP | 2013-147648 | 8/2013 |
| RU | 2570023 C2 | 12/2015 |
| WO | 2012118546 A1 | 9/2012 |
| WO | 2013/094763 | 6/2013 |
| WO | 2013/094764 | 6/2013 |
| WO | 2017/094737 | 6/2017 |
| WO | 2017/094738 | 6/2017 |

OTHER PUBLICATIONS

Russian Office Action & Search Report, Russian Patent Office, Application No. 2019126939, dated Apr. 13, 2020, English translation.

Official Communication issued in International Bureau of WIPO Patent Application No. PCT/JP2018/001681, dated Apr. 17, 2018, along with an English translation thereof.

Extended European Search Report of the corresponding European Application No. 18745212.3, dated Jul. 23, 2020.

Office Action in corresponding Japanese application No. JP 2018-564537, dated Apr. 7, 2021 with English Machine translation.

Office Action issued in corresponding European Application No. 18745212.3, dated May 26, 2021.

Office Action issued in corresponding Indian Application No. 201917033507, dated Jul. 1, 2021.

Office Action issued in corresponding Chinese Application No. 201880006692.7, dated Jun. 10, 2021 along with English machine translation.

* cited by examiner

MODIFIER AND USE METHOD THEREOF, MODIFIER PRODUCTION METHOD AND CARRIER FOR ADDITIVE

TECHNICAL FIELD

The present invention relates to a modifier and a method for using the same, a method for producing the modifier, and a carrier for an additive. More specifically, the present invention relates to a modifier that can be added to a polyolefin resin to obtain a molded body having improved impact resistance and a method for using the same, a method for producing the modifier, and a carrier for an additive.

BACKGROUND ART

Attempts have heretofore been made to mix different types of resins to obtain mixed resins that can offer characteristics superior to those that are offered by each of the resins alone. For example, in the following Patent Literatures 1 to 4, the present inventors disclose a technique in which a polyamide resin and a polyolefin resin are used in combination to obtain a mixed resin having improved characteristics.

CITATION LIST

Patent Literatures

Patent Literature 1: JP 2013-147645 A
Patent Literature 2: JP 2013-147646 A
Patent Literature 3: JP 2013-147647 A
Patent Literature 4: JP 2013-147648 A

SUMMARY OF INVENTION

Technical Problems

Patent Literature 1 discloses a polymer alloy (thermoplastic resin composition) of a polyamide resin and a polyolefin resin obtained by using, as a compatibilizer, a modified elastomer having a reactive group capable of reacting with the polyamide resin.

Patent Literature 2 discloses that a plant-derived polyamide resin can be used as a polyamide resin contained in a polymer alloy of a polyamide resin and a polyolefin resin.

Patent Literature 3 discloses a polymer alloy containing a polyamide resin and a polyolefin resin, which has a resin phase-separated structure having a continuous phase, a dispersed phase dispersed in the continuous phase, and a fine dispersed phase further dispersed in the dispersed phase.

Patent Literature 4 discloses that a polymer alloy having excellent impact resistance can be obtained by first melt-mixing a polyamide resin and a compatibilizer to obtain a mixed resin and then further melt-mixing the mixed resin and a polyolefin resin.

However, according to the above Patent Literatures 1 to 4, the present inventors have studied the production and use of these polymer alloys alone, but have not studied the use of these polymer alloys together with other resins.

In light of the above circumstances, it is an object of the present invention to provide a modifier that contains a polyamide resin and a polyolefin resin and that can be blended with a polyolefin resin to obtain a molded body having excellent impact resistance and a method for using the same and a method for producing the modifier.

Solutions to Problems

The present invention is as follows.
In order to achieve the above object, the present invention is directed to a modifier according to claim 1 that can be added to a first polyolefin resin to obtain a molded body having improved impact resistance, the modifier including:
a continuous phase (A) containing a second polyolefin resin; and a dispersed phase (B) dispersed in the continuous phase (A) and containing a polyamide resin and a modified elastomer, wherein
the dispersed phase (B) is composed of a melt-kneaded product of the polyamide resin and the modified elastomer,
the modified elastomer is an elastomer having a reactive group that reacts with the polyamide resin,
the elastomer is an olefin-based thermoplastic elastomer having, as a skeleton, a copolymer of ethylene or propylene and an α-olefin having 3 to 8 carbon atoms or a styrene-based thermoplastic elastomer having a styrene skeleton, and
when a total of the continuous phase (A) and the dispersed phase (B) is taken as 100% by mass, a content of the dispersed phase (B) is 80% by mass or less.

A modifier according to claim 2 is the modifier according to claim 1, wherein when a total of the polyamide resin and the modified elastomer is taken as 100% by mass, a content of the polyamide resin is 10% by mass or more but 80% by mass or less.

A modifier according to claim 3 is the modifier according to claim 1 or 2, wherein the dispersed phase (B) has a continuous phase ($B_1$) containing the polyamide resin and a fine dispersed phase ($B_2$) dispersed in the continuous phase ($B_1$) and containing the modified elastomer.

A modifier according to claim 4 is the modifier according to any one of claims 1 to 3, wherein the polyamide resin is polyamide 6.

A modifier according to claim 5 is the modifier according to claim 4, wherein the second polyolefin resin has a number-average molecular weight of 300,000 or more.

A modifier according to claim 6 is the modifier according to any one of claims 1 to 5, wherein the first polyolefin resin is a block copolymerized polyolefin resin having an ethylene block as a dispersed phase.

A method for using a modifier according to claim 7 is a method for using the modifier according to claim 1, the method including
mixing the modifier with the first polyolefin resin in an amount of 0.5 parts by mass or more but 80 parts by mass or less per 100 parts by mass of the first polyolefin resin.

A method for producing a modifier according to claim 8 is a method for producing the modifier according to claim 1, the method including
a melt-kneading step in which the second polyolefin resin and a melt-kneaded product of the polyamide resin and the modified elastomer are melt-kneaded.

A carrier for an additive according to claim 9 is a carrier for an additive for use in adding an additive to a first polyolefin resin, the carrier including:
a continuous phase (A) containing a second polyolefin resin; and a dispersed phase (B) dispersed in the continuous phase (A) and containing a polyamide resin and a modified elastomer, wherein
the dispersed phase (B) is composed of a melt-kneaded product of the polyamide resin and the modified elastomer,
the modified elastomer is an elastomer having a reactive group that reacts with the polyamide resin,
the elastomer is an olefin-based thermoplastic elastomer having, as a skeleton, a copolymer of ethylene or propylene and an α-olefin having 3 to 8 carbon atoms or a styrene-based thermoplastic elastomer having a styrene skeleton, and when a total of the continuous phase (A) and the dispersed phase (B) is taken as 100% by mass, a content of the dispersed phase (B) is 80% by mass or less.

A carrier for an additive according to claim 10 is the carrier for an additive according to claim 9, wherein the additive is at least one of a flame retardant, a flame retardant aid, a filler, a colorant, an antimicrobial agent, an antistatic agent, and a foaming agent.

Advantageous Effects of Invention

When the first polyolefin resin is blended with the modifier according to the present invention, a thermoplastic resin composition having excellent impact resistance and a pellet mixture can be obtained, and further a molded body can be obtained by using the thermoplastic resin composition or the pellet mixture.

When the total of the polyamide resin and the modified elastomer is taken as 100% by mass and the content of the polyamide resin is 10% by mass or more but 80% by mass or less, a specific phase structure can be more stably obtained, and therefore a thermoplastic resin composition that can exhibit excellent impact resistance and a pellet mixture can be obtained, and further a molded body can be obtained by using the thermoplastic resin composition or the pellet mixture.

When the dispersed phase (B) has a continuous phase ($B_1$) containing the polyamide resin and a fine dispersed phase ($B_2$) dispersed in the continuous phase ($B_1$) and containing the modified elastomer, a multiple phase structure is formed, and therefore a thermoplastic resin composition having more excellent impact resistance and a pellet mixture can be obtained, and further a molded body can be obtained by using the thermoplastic resin composition or the pellet mixture.

When the polyamide resin is polyamide 6, a thermoplastic resin composition that can exhibit more excellent impact resistance while well maintaining the tensile elastic modulus of the first polyolefin resin and a pellet mixture can be obtained, and further a molded body can be obtained by using the thermoplastic resin composition or the pellet mixture.

When the polyamide resin is polyamide 6 and the second polyolefin resin has a number-average molecular weight of 300,000 or more, a thermoplastic resin composition having particularly excellent impact resistance and a pellet mixture can be obtained, and further a molded body can be obtained by using the thermoplastic resin composition or the pellet mixture.

When the first polyolefin resin is a block copolymerized polyolefin resin having an ethylene block as a dispersed phase, at least part of the ethylene block is aggregated at the interface between the continuous phase (A) and the dispersed phase (B), and a multiple phase structure is formed, and therefore a thermoplastic resin composition having more excellent impact resistance and a pellet mixture can be obtained, and further a molded body can be obtained by using the thermoplastic resin composition or the pellet mixture.

According to the method for using the modifier of the present invention and the method for producing the modifier of the present invention, the first polyolefin resin is modified so that a thermoplastic resin composition having excellent impact resistance and a pellet mixture can be obtained, and further a molded body can be obtained by using the thermoplastic resin composition or the pellet mixture. Further, since the component that imparts impact resistance is used separately from the first polyolefin resin, a molded body can be obtained by applying a heat load to the first polyolefin resin only once during molding, which results in a reduction in the heat history of the molded body.

The carrier for an additive according to the present invention makes it possible to blend an additive with the first polyolefin resin at an accurate ratio and to obtain a thermoplastic resin composition and a molded body that have improved impact resistance.

DESCRIPTION OF EMBODIMENTS

Figure 1:
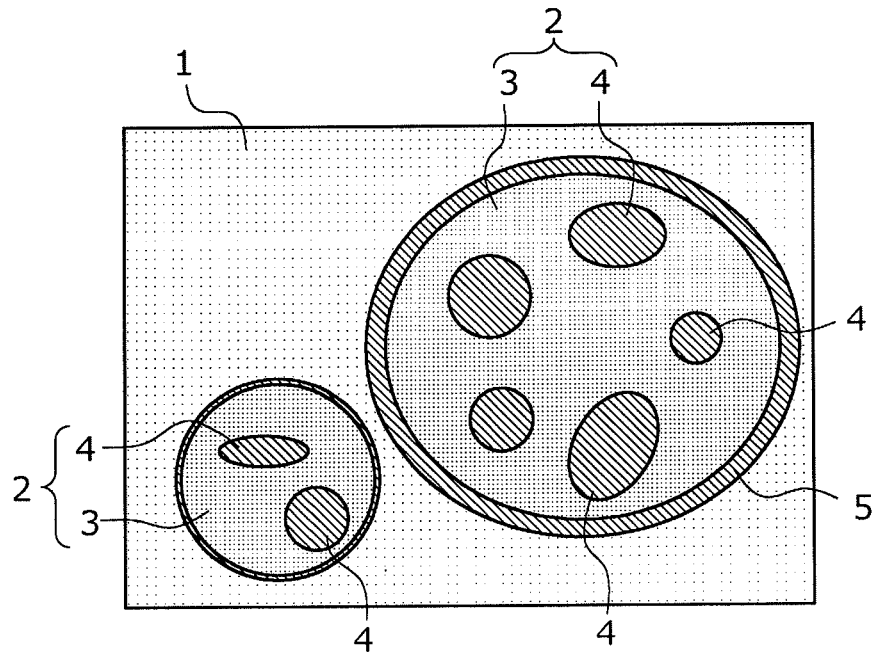
FIG. 1 is a schematic diagram for explaining the phase structure of a resin composition constituting test specimens for evaluation of Examples.

The particulars shown herein are by way of example and for the purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for a fundamental understanding of the present invention, the description taken with the drawings making apparent to those skilled in the art how the several forms of the present invention may be embodied in practice.

A modifier according to the present invention is a modifier that can be added to a first polyolefin resin to obtain a molded body having improved impact resistance, the modifier including:

a continuous phase (A) containing a second polyolefin resin; and a dispersed phase (B) dispersed in the continuous phase (A) and containing a polyamide resin and a modified elastomer, wherein the dispersed phase (B) is composed of a melt-kneaded product of the polyamide resin and the modified elastomer, the modified elastomer is an elastomer having a reactive group that reacts with the polyamide resin, the elastomer is an olefin-based thermoplastic elastomer having, as a skeleton, a copolymer of ethylene or propylene and an α-olefin having 3 to 8 carbon atoms or a styrene-based thermoplastic elastomer having a styrene skeleton, and when a total of the continuous phase (A) and the dispersed phase (B) is taken as 100% by mass, a content of the dispersed phase (B) is 80% by mass or less.

The modifier can be blended with the first polyolefin resin to obtain a thermoplastic resin composition that is a modified polyolefin resin-based composition. Further, this thermoplastic resin composition can be molded to obtain a modified molded body. The modifier can be molded together with the first polyolefin resin (for example, a dry blend of pellets can be molded) to obtain a modified molded body. In either case, as described above, a modified molded body can finally be obtained.

A thermoplastic resin composition obtained by using the modifier and a molded body using the same have a continuous phase (A') containing a first polyolefin resin and a second polyolefin resin, and a dispersed phase (B) dispersed in the continuous phase (A') and containing a polyamide resin and a modified elastomer, wherein the dispersed phase (B) is composed of a melt-kneaded product of the polyamide resin and the modified elastomer having a reactive group that reacts with the polyamide resin.

[1] Modifier (1) Second Polyolefin Resin

The "second polyolefin resin" (hereinafter also simply referred to as a "second polyolefin") is an olefin homopolymer and/or an olefin copolymer. In the modifier, the second polyolefin resin is a component that is contained in the continuous phase (A) and forms the continuous phase (A). In the thermoplastic resin composition using the modifier and the molded body, the second polyolefin resin is a component that is contained in the continuous phase (A') together with the first polyolefin resin and forms the continuous phase (A').

An olefin constituting the second polyolefin is not particularly limited, but examples thereof include ethylene, propylene, 1-butene, 3-methyl-1-butene, 1-pentene, 3-methyl-1-pentene, 4-methyl-1-pentene, 1-hexene, and 1-octene. These olefins may be used singly or in combination of two or more of them.

Specific examples of the polyolefin resin include a polyethylene resin, a polypropylene resin, poly-1-butene, poly-1-hexene, poly-4-methyl-1-pentene. These polymers may be used singly or in combination of two or more of them. That is, the polyolefin resin may be a mixture of the above polymers.

Examples of the polyethylene resin include an ethylene homopolymer and a copolymer of ethylene and another olefin. Examples of the latter include an ethylene-1-butene copolymer, an ethylene-1-hexene copolymer, an ethylene-1-octene copolymer, and an ethylene-4-methyl-1-pentene copolymer (the content of an ethylene-derived structural unit is 50% or more of the total structural units).

Examples of the polypropylene resin include a propylene homopolymer and a copolymer of propylene and another olefin.

Examples of the other olefin constituting the copolymer of propylene and another olefin include the above-mentioned various olefins (except for propylene). Among them, for example, ethylene and 1-butene are preferred. That is, the copolymer of propylene and another olefin is preferably a propylene-ethylene copolymer or a propylene-1-butene copolymer.

The copolymer of propylene and another olefin may be either a random copolymer or a block copolymer. Among them, a block copolymer is preferred in terms of excellent impact resistance. Particularly, a propylene-ethylene block copolymer having ethylene as another olefin is preferred. This propylene-ethylene block copolymer is a block copolymerized polypropylene having an ethylene block as a dispersed phase. More specifically, the propylene-ethylene block copolymer is a polypropylene resin having a continuous phase composed of homopolypropylene and a dispersed phase present in the continuous phase and containing polyethylene. Such a block copolymerized polypropylene having an ethylene block as a dispersed phase is also called, for example, an impact copolymer, a polypropylene impact copolymer, a heterophasic polypropylene, or a heterophasic block polypropylene. This block copolymerized polypropylene is preferred in terms of excellent impact resistance.

It is to be noted that the content of a propylene-derived unit of the copolymer of propylene and another olefin is 50% or more of the total structural units.

The number-average molecular weight of the second polyolefin resin is not particularly limited, and may be, for example, 10,000 or more (usually, 700,000 or less), but is preferably 100,000 or more, more preferably 200,000 or more.

It is to be noted that the number-average molecular weight of the second polyolefin resin is determined by gel permeation chromatography (GPC) based on polystyrene standards. When the second polyolefin resin used in the present invention is a homopolymer, the above numerical ranges of the number-average molecular weight can be respectively regarded as the numerical ranges of a weight-average molecular weight.

When the polyamide that will be described later is polyamide 6, the number-average molecular weight of the second polyolefin resin may be 300,000 or more (usually 700,000 or less), but is preferably 310,000 or more, more preferably 350,000 or more, even more preferably 370,000 or more, even more preferably 400,000 or more, particularly preferably 450,000 or more, more particularly preferably 470,000 or more, and even more particularly preferably 500,000 or more.

In this case, a thermoplastic resin composition that can exhibit excellent impact resistance while well maintaining the tensile elastic modulus of the first polyolefin resin, a pellet mixture, and a molded body using the thermoplastic resin composition or the pellet mixture can be obtained.

It is to be noted that the upper limit of the number-average molecular weight may be, for example, 700,000 or less as described above, but further may be 650,000 or less and further may be 600,000 or less.

The MFR (melt flow rate) of the second polyolefin resin is not particularly limited. The molecular weight (including number-average molecular weight) of a polyolefin resin usually bears a proportional relation to MFR. The MFR of the second polyolefin resin is preferably, for example, 25 g/10 min or less. The lower limit of the MFR is not particularly limited, but may be, for example, 1 g/10 min or more. The MFR is preferably 22 g/10 min or less, more preferably 19 g/10 min or less, even more preferably 16 g/10 min or less, even more preferably 13 g/10 min or less, particularly preferably 10 g/10 min or less, more particularly preferably 9 g/10 min or less, and even more particularly preferably 8 g/10 min or less.

The MFR of the second polyolefin resin is measured in accordance with JIS K 7210 under conditions of a temperature of 230° C. and a load of 21.18 N (2.16 kgf).

It is to be noted that the second polyolefin resin is a polyolefin that has no affinity for the polyamide resin that will be described later, and that has no reactive group capable of reacting with the polyamide resin, either. In this point, the second polyolefin resin is different from an olefin-based component as the modified elastomer that will be describe later.

(2) Polyamide Resin

The "polyamide resin" is a polymer having a chain-like skeleton formed by polymerizing a plurality of monomers via amide bonds (—NH—CO—). In the modifier, this polyamide resin is a component contained in the dispersed phase (B) together with the modified elastomer. In the thermoplastic resin composition obtained by using the modifier and the molded body, the polyamide resin forms the dispersed phase (B) in the continuous phase (A') containing both the first and second polyolefin resins.

Examples of a monomer constituting the polyamide resin include amino acids such as 6-aminocaproic acid, 11-aminoundecanoic acid, 12-aminododecanoic acid, and para-aminomethyl benzoic acid, and lactams such as ε-caprolactam, undecane lactam, and ω-lauryl lactam. These olefins may be used singly or in combination of two or more of them.

Further, the polyamide resin can be obtained by copolymerization of a diamine and a dicarboxylic acid. In this case, examples of the diamine as a monomer include: aliphatic diamines such as ethylene diamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1-20-diaminoeicosane, 2-methyl-1,5-diaminopentane, and 2-methyl-1,8-diaminooctane; alicyclic diamines such as cyclohexane diamine and bis-(4-aminocyclohexyl)methane; and aromatic diamines such as xylylene diamines (e.g., p-phenylenediamine and m-phenylenediamine). These olefins may be used singly or in combination of two or more of them.

Examples of the dicarboxylic acid as a monomer include: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; alicyclic dicarboxylic acids such as cyclohexanedicarboxylic acid; and aromatic dicarboxylic acids such as phthalic acid, terephthalic acid, isophthalic acid, and naphthalenedicarboxylic acid. These olefins may be used singly or in combination of two or more of them.

Specific examples of the polyamide resin include polyamide 6, polyamide 66, polyamide 11, polyamide 610, polyamide 612, polyamide 614, polyamide 12, polyamide 6T, polyamide 6I, polyamide 9T, polyamide M5T, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T. These polyamides may be used singly or in combination of two or more of them.

In the present invention, among the above-mentioned various polyamide resins, plant-derived polyamide resins can be used. Plant-derived polyamide resins are preferred from the viewpoint of environmental protection (particularly from the viewpoint of carbon neutral) because they are resins using monomers derived from plant-derived components such as vegetable oils.

Examples of the plant-derived polyamide resins include polyamide 11 (hereinafter also simply referred to as "PA11"), polyamide 610 (hereinafter also simply referred to as "PA610"), polyamide 612 (hereinafter also simply referred to as "PA612"), polyamide 614 (hereinafter also simply referred to as "PA614"), polyamide 1010 (hereinafter also simply referred to as "PA1010"), polyamide 1012 (hereinafter also simply referred to as "PA1012"), and polyamide 10T (hereinafter also simply referred to as "PA10T"). These olefins may be used singly or in combination of two or more of them.

Among the above-mentioned polyamide resins, PA11 has a structure in which monomers having 11 carbon atoms are linked via amide bonds. PA11 can be obtained by using aminoundecanoic acid derived from castor oil as a monomer. The content of a structural unit derived from the monomer having 11 carbon atoms in PA 11 is preferably 50% or more or may be 100% of all the structural units of PA11.

PA610 has a structure in which monomers having 6 carbon atoms and monomers having 10 carbon atoms are linked via amide bonds. PA610 can be obtained by using sebacic acid derived from castor oil as a monomer. The total content of a structural unit derived from the monomer having 6 carbon atoms and a structural unit derived from the monomer having 10 carbon atoms in PA610 is preferably 50% or more or may be 100% of all the structural units of PA610.

PA1010 has a structure in which a diamine having 10 carbon atoms and a dicarboxylic acid having 10 carbon atoms are copolymerized. PA1010 can be obtained by using 1,10-decanediamine (decamethylene diamine) and sebacic acid, which are derived from castor oil, as monomers. The total content of a structural unit derived from the diamine having 10 carbon atoms and a structural unit derived from the dicarboxylic acid having 10 carbon atoms in PA1010 is preferably 50% or more or may be 100% of all the structural units of PA1010.

PA614 has a structure in which a monomer having 6 carbon atoms and a monomer having 14 carbon atoms are linked via amide bonds. PA614 can be obtained by using a plant-derived dicarboxylic acid having 14 carbon atoms as a monomer. The total content of a structural unit derived from a monomer having 6 carbon atoms and a structural unit derived from a monomer having 14 carbon atoms in PA614 is preferably 50% or more but may be 100% of all the structural units of PA614.

PA10T has a structure in which a diamine having 10 carbon atoms and terephthalic acid are linked via amide bonds. PA10T can be obtained by using 1,10-decanediamine (decamethylene diamine) derived from castor oil as a monomer. The total content of a structural unit derived from the diamine having 10 carbon atoms and a structural unit derived from terephthalic acid in PA10T is preferably 50% or more or may be 100% of all the structural units of PA10T.

Among the above five plant-derived polyamide resins, PA 11 is superior to the other four plant-derived polyamide resins in terms of low water absorbability, low specific gravity, and high biomass degree.

Polyamide 610 is inferior to PA11 in water absorption rate, chemical resistance, and impact strength, but is excellent in heat resistance (melting point) and rigidity (strength). Further, polyamide 610 has lower water absorbability and is superior to polyamide 6 or polyamide 66 in size stability, and therefore can be used as an alternative to polyamide 6 or polyamide 66.

Polyamide 1010 is superior to PA11 in heat resistance and rigidity. Further, the biomass degree of polyamide 1010 is comparable to that of PA11 and therefore polyamide 1010 can be used for parts required to have higher durability.

Polyamide 10T has an aromatic ring in its molecular skeleton, and therefore has a higher melting point and higher rigidity than polyamide 1010. Therefore, polyamide 10T can be used in harsh environments (as parts required to have heat resistance or parts on which a force is to be exerted).

In the present invention, among the above-described various polyamide resins, polyamide 6 can be used.

The use of polyamide 6 is preferred because a thermoplastic resin composition that can exhibit more excellent impact resistance while well maintaining the tensile elastic modulus of the first polyolefin resin and a pellet mixture can be obtained, and further a molded body can be obtained using the thermoplastic resin composition or the pellet mixture. Further, as compared with a case where another polyamide such as the above-described polyamide 11 is used, the modifier can achieve comparable or higher performance even when the content of the polyamide is relatively smaller, which is advantageous in terms of costs. Further, as compared with a case where another polyamide such as polyamide 11 is used, the thermoplastic resin composition can achieve comparable or higher performance (especially, tensile elastic modulus) even when the amount of the modifier added is smaller, which is advantageous in terms of costs.

(3) Modified Elastomer

The "modified elastomer" is an elastomer having a reactive group that reacts with the polyamide resin. That is, the modified elastomer is an elastomer to which a reactive group that can react with the polyamide resin is given. In the modifier, this modified elastomer is a component contained in the dispersed phase (B) together with the polyamide resin. In the thermoplastic resin composition obtained by using the modifier and the molded body, the modified elastomer forms the dispersed phase (B) together with the polyamide resin in the continuous phase (A') containing both the first and second polyolefin resins.

The modified elastomer is preferably a component having an affinity for the second polyolefin resin. More specifically, the modified elastomer is preferably a component having compatibilizing effect on the polyamide resin and the second polyolefin resin. In other words, the modified elastomer is preferably a compatibilizer for the polyamide resin and the second polyolefin resin.

The elastomer (i.e., a skeletal resin constituting the skeleton of the modified elastomer) is an olefin-based thermoplastic elastomer having, as a skeleton, a copolymer of ethylene or propylene and an α-olefin having 3 to 8 carbon atoms (i.e., a copolymer of ethylene and an α-olefin having 3 to 8 carbon atoms or a copolymer of propylene and an α-olefin having 4 to 8 carbon atoms) or a styrene-based thermoplastic elastomer having a styrene skeleton. These elastomers may be used singly or in combination of two or more of them.

Examples of the α-olefin having 3 to 8 carbon atoms include propylene, 1-butene, 3-methyl-1-butene, 1-pentene, 3-methyl-1-pentene, 4-methyl-1-pentene, 1-hexene, and 1-octene.

Examples of the copolymer of ethylene and an α-olefin having 3 to 8 carbon atoms include an ethylene-propylene copolymer (EPR), an ethylene-1-butene copolymer (EBR), an ethylene-1-pentene copolymer, and an ethylene-1-octene copolymer (EOR).

Examples of the copolymer of propylene and an α-olefin having 4 to 8 carbon atoms include a propylene-1-butene copolymer (PBR), a propylene-1-pentene copolymer, and a propylene-1-octene copolymer (POR). These olefins may be used singly or in combination of two or more of them.

Examples of the styrene-based thermoplastic elastomer include a block copolymer of a styrene-based compound and a conjugated diene compound and a hydrogenated product thereof.

Examples of the styrene-based compound include styrene, alkyl styrenes such as α-methyl styrene, p-methyl styrene, and p-t-butyl styrene, p-methoxy styrene, and vinyl naphthalene. These olefins may be used singly or in combination of two or more of them.

Examples of the conjugated diene compound include butadiene, isoprene, piperylene, methyl pentadiene, phenyl butadiene, 3,4-dimethyl-1,3-hexadiene, and 4,5-diethyl-1,3-octadiene. These olefins may be used singly or in combination of two or more of them.

Specific examples of the styrene-based thermoplastic elastomer include a styrene-butadiene-styrene (SBS) copolymer, a styrene-isoprene-styrene (SIS) copolymer, a styrene-ethylene/butylene-styrene (SEBS) copolymer, and a styrene-ethylene/propylene-styrene (SEPS) copolymer. These olefins may be used singly or in combination of two or more of them. Among them, SEBS is preferred.

Examples of the reactive group that reacts with the polyamide resin (the reactive group given to the elastomer) include an acid anhydride group (—CO—O—OC—), a carboxyl group (—COOH), an epoxy group {—$C_2O$ (a three-membered ring structure composed of two carbon atoms and one oxygen atom)}, an oxazoline group (—$C_3H_4NO$), and an isocyanate group (—NCO). These reactive groups may be given singly or in combination of two or more of them.

It is to be noted that the amount of modification of the modified elastomer is not limited, and the modified elastomer only needs to have one or more reactive groups per molecule. Further, the modified elastomer preferably has 1 or more but 50 or less reactive groups, more preferably 3 or more but 30 or less reactive groups, particularly preferably 5 or more but 20 or less reactive groups per molecule.

Examples of the modified elastomer include: a polymer using any monomer capable of introducing a reactive group as a raw material monomer (a modified elastomer obtained by polymerization using monomers capable of introducing a reactive group as part of raw material monomers); an oxidative degradation product of a polymer containing a skeletal resin (a modified elastomer having a reactive group formed by oxidative degradation); and a graft polymer obtained by graft polymerization of an organic acid on a skeletal resin (a modified elastomer having a reactive group introduced by graft polymerization of an organic acid). These olefins may be used singly or in combination of two or more of them.

Examples of the monomer capable of introducing a reactive group include a monomer having a polymerizable unsaturated bond and an acid anhydride group, a monomer having a polymerizable unsaturated bond and a carboxyl group, and a monomer having a polymerizable unsaturated bond and an epoxy group.

Specific examples of the monomer capable of introducing a reactive group include: acid anhydrides such as maleic anhydride, itaconic anhydride, succinic anhydride, glutaric anhydride, adipic anhydride, citraconic anhydride, tetrahydrophthalic anhydride, and butenyl succinic anhydride; and carboxylic acids such as maleic acid, itaconic acid, fumaric acid, acrylic acid, and methacrylic acid. These monomers may be used singly or in combination of two or more of them. Among these compounds, acid anhydrides are preferred, maleic anhydride and itaconic anhydride are more preferred, and maleic anhydride is particularly preferred.

The molecular weight of the modified elastomer is not particularly limited, but the weight-average molecular weight of the modified elastomer is preferably 10,000 or more but 500,000 or less, more preferably 35,000 or more but 500,000 or less, particularly preferably 35,000 or more but 300,000 or less. It is to be noted that the weight-average molecular weight is measured by GPC (based on polystyrene standards).

(4) Other Components that may be Contained in Modifier

The modifier may use other components, such as another thermoplastic resin, in addition to the second polyolefin resin, the polyamide resin, and the modified elastomer. These olefins may be used singly or in combination of two or more of them.

Examples of the other thermoplastic resin include polyester-based resins (polybutylene terephthalate, polyethylene terephthalate, polycarbonate, polybutylene succinate, polyethylene succinate, and polylactic acid). These olefins may be used singly or in combination of two or more of them.

(5) Phase Structure of Modifier

In the modifier, the second polyolefin resin forms the continuous phase (A). Further, the polyamide resin and the modified elastomer form the dispersed phase (B). The dispersed phase (B) is dispersed in the continuous phase (A). This phase structure can be obtained as a thermoplastic resin obtained by melt-kneading a melt-kneaded product of the polyamide resin and the modified elastomer and the second polyolefin resin.

Further, in the modifier, the polyamide resin constituting the dispersed phase (B), which is composed of the polyamide resin and the modified elastomer, forms a continuous phase ($B_1$) in the dispersed phase (B), and at least the modified elastomer out of the polyamide resin and the modified elastomer can form a fine dispersed phase ($B_2$) in the dispersed phase (B). When the modifier has such a multiple phase structure in which the fine dispersed phase ($B_2$) is further contained in the dispersed phase (B), a thermoplastic resin composition and a molded body having more excellent impact resistance can be obtained.

Further, in the modifier, when the second polyolefin resin is a block copolymerized polyolefin resin having an ethylene block as a dispersed phase, at least part of the ethylene block constituting the block copolymerized polyolefin resin can be aggregated at the interface between the continuous phase (A) and the dispersed phase (B). Also when the modifier has such a phase structure, a thermoplastic resin composition and a molded body having more excellent impact resistance can be obtained.

The size of the dispersed phase (B) contained in the continuous phase (A) of the modifier is not particularly limited, but the average diameter (average particle diameter) of the dispersed phase (B) is preferably 10000 nm or less, more preferably 50 nm or more but 8000 nm or less, even more preferably 100 nm or more but 4000 nm or less. The average diameter of the dispersed phase (B) is the average value (nm) of the maximum lengths of 50 dispersed phase particles (B) randomly selected in an image obtained by using an electron microscope.

The size of the fine dispersed phase ($B_2$) contained in the dispersed phase (B) of the modifier is not particularly limited, but the average diameter (average particle diameter) of the fine dispersed phase ($B_2$) is preferably 5 nm or more but 1000 nm or less, more preferably 5 nm or more but 600 nm or less, even more preferably 10 nm or more but 400 nm or less, particularly preferably 15 nm or more but 350 nm or less. The average diameter of the fine dispersed phase ($B_2$) is the average value (nm) of the maximum lengths of 100 fine dispersed phase particles ($B_2$) randomly selected in an image obtained by using an electron microscope.

(6) Blending Ratio

When the total of the continuous phase (A) and the dispersed phase (B) in the modifier is taken as 100% by mass, the content of the dispersed phase (B) is 80% by mass or less. More specifically, when the amount of the second polyolefin resin is defined as $W_A$, the total amount of the polyamide resin and the modified elastomer is defined as $W_B$, and the total of $W_A$ and $W_B$ is taken as 100% by mass, the ratio of $W_B$ is usually 80% by mass or less (usually 0.5% by mass or more). When the ratio of $W_B$ is within the above range, excellent impact resistance and excellent balance between rigidity and moldability can be achieved. The ratio is preferably 5% by mass or more but 78% by mass or less, more preferably 10% by mass or more but 77% by mass or less, even more preferably 23% by mass or more but 76% by mass or less, even more preferably 30% by mass or more but 75% by mass or less, particularly preferably 33% by mass or more but 72% by mass or less, more particularly preferably 35% by mass or more but 67% by mass or less, even more particularly preferably 37% by mass or more but 63% by mass or less.

In addition, when the total of the polyamide resin and the modified elastomer is taken as 100% by mass, the content of the polyamide resin may be 10% by mass or more but 80% by mass or less. When the content of the polyamide resin is within the above range, a phase structure can be obtained in which the second polyolefin resin forms a continuous phase (A) and the polyamide resin forms a dispersed phase (B). This makes it possible to obtain a thermoplastic resin composition and a molded body having excellent impact resistance and excellent rigidity. The content of the polyamide resin is preferably 12% by mass or more but 78% by mass or less, more preferably 14% by mass or more but 75% by mass or less, even more preferably 25% by mass or more but 73% by mass or less, even more preferably 30% by mass or more but 71% by mass or less, particularly preferably 34% by mass or more but 68% by mass or less, more particularly preferably 40% by mass or more but 64% by mass or less. When the content of the polyamide resin is within the above range, the polyamide resin and the modified elastomer can be dispersed as smaller particles of the dispersed phase (B) in the continuous phase (A). Further, the amount of the polyamide resin, which has a large specific gravity, to be used can be reduced to reduce the specific gravity of the thermoplastic resin composition and the molded body. This allows the thermoplastic resin composition and the molded body to have excellent impact resistance and rigidity while being lightweight.

Further, since the content of the polyamide resin can be reduced while such mechanical characteristics are well maintained, the thermoplastic resin composition and the molded body can have sedate appearance with low surface luster. Therefore, the thermoplastic resin composition and the molded body can be applied to exterior and interior materials that are directly visually recognized, and can offer excellent design flexibility.

It is to be noted that from the viewpoint of obtaining a polyamide resin rich-type modifier whose polyamide resin content is 50% by mass or more, the content of the polyamide resin may be 50% by mass or more but 80% by mass or less when the total of the polyamide resin and the modified elastomer is taken as 100% by mass.

When the polyamide is polyamide 6 and the total of the polyamide resin and the modified elastomer is taken as 100% by mass, the content of the polyamide resin may be 10% by mass or more but 80% by mass or less, but is preferably 12% by mass or more but 68% by mass or less, more preferably 14% by mass or more but 65% by mass or less, even more preferably 16% by mass or more but 63% by mass or less, even more preferably 18% by mass or more but 61% by mass or less, particularly preferably 20% by mass or more but 58% by mass or less, more particularly preferably 25% by mass or more but 54% by mass or less.

When the content of the polyamide resin is within the above range, a phase structure can be obtained in which the second polyolefin resin forms a continuous phase (A) and the polyamide resin forms a dispersed phase (B). This makes it possible to obtain a thermoplastic resin composition and a molded body having excellent impact resistance and excellent rigidity. When the content of the polyamide resin is within the above range, the polyamide resin and the modified elastomer can be dispersed as smaller particles of the dispersed phase (B) in the continuous phase (A). Further, the amount of the polyamide resin, which has a large specific gravity, to be used can be reduced to reduce the specific gravity of the thermoplastic resin composition and the molded body. This allows the thermoplastic resin composition and the molded body to have excellent impact resistance and rigidity while being lightweight. Further, a thermoplastic resin composition that can exhibit more excellent impact resistance while well maintaining the tensile elastic modulus of the first polyolefin resin and a pellet mixture can be obtained, and further a molded body can be obtained using the thermoplastic resin composition or the pellet mixture. Further, such a thermoplastic resin composition etc. can be obtained even when the amount of the polyamide 6 blended is relatively smaller than that of another polyamide such as the above-mentioned polyamide 11, which offers cost advantages.

When the total of the second polyolefin resin and the polyamide resin in the modifier is taken as 100% by mass, the content of the polyamide resin may be 60% by mass or less (usually 1% by mass or more). The content is preferably 5% by mass or more but 55% by mass or less, more preferably 15% by mass or more but 53% by mass or less, even more preferably 19% by mass or more but 50% by mass or less, even more preferably 21% by mass or more but 48% by mass or less, particularly preferably 23% by mass or more but 46% by mass or less, more particularly preferably 25% by mass or more but 44% by mass or less, even more particularly preferably 28% by mass or more but 43% by mass or less.

When the polyamide is polyamide 6 and the total of the second polyolefin resin and the polyamide resin is taken as 100% by mass, the content of the polyamide resin may be 60% by mass or less (usually 1% by mass or more), but is preferably 5% by mass or more but 45% by mass or less, more preferably 7% by mass or more but 43% by mass or less, even more preferably 9% by mass or more but 40% by mass or less, even more preferably 11% by mass or more but 38% by mass or less, particularly preferably 13% by mass or more but 36% by mass or less, more particularly preferably 15% by mass or more but 34% by mass or less, even more particularly preferably 18% by mass or more but 33% by mass or less.

When the total of the second polyolefin resin, the polyamide resin, and the modified elastomer is taken as 100% by mass, the content of the polyamide resin may be 1% by mass or more but 60% by mass or less. The content of the polyamide resin is preferably 3% by mass or more but 50% by mass or less, more preferably 5% by mass or more but 45% by mass or less, even more preferably 7% by mass or more but 40% by mass or less, even more preferably 9% by mass or more but 35% by mass or less, particularly preferably 12% by mass or more but 30% by mass or less.

When the total of the second polyolefin resin, the polyamide resin, and the modified elastomer is taken as 100% by mass, the content of the modified elastomer may be 1% by mass or more but 70% by mass or less. When the content of the modified elastomer is within the above range, it is possible to obtain a thermoplastic resin composition and a molded body having excellent impact resistance and excellent rigidity. The content of the modified elastomer is preferably 2% by mass or more but 65% by mass or less, more preferably 3% by mass or more but 60% by mass or less, even more preferably 5% by mass or more but 55% by mass or less, even more preferably 7% by mass or more but 50% by mass or less, particularly preferably 13% by mass or more but 47% by mass or less, more particularly preferably 17% by mass or more but 45% by mass or less.

[2] Thermoplastic Resin Composition and Molded Body

The modifier can be added to the first polyolefin resin to obtain a thermoplastic resin composition and a molded body. The modifier can improve the impact resistance of the thus obtained thermoplastic resin composition and the molded body.

(1) First Polyolefin Resin

The "first polyolefin resin" (hereinafter also simply referred to as "first polyolefin") is an olefin homopolymer and/or an olefin copolymer. In the thermoplastic resin composition obtained by using the modifier and the molded body, the first polyolefin resin is a component that is contained in the continuous phase (A') together with the second polyolefin resin and forms the continuous phase (A').

An olefin constituting the first polyolefin is not particularly limited, and examples thereof include the olefins mentioned above with reference to the second polyolefin.

The number-average molecular weight of the first polyolefin resin is not particularly limited, and may be, for example, 10,000 or more but 500,000 or less, but is preferably 100,000 or more but 450,000 or less, more preferably 150,000 or more but 400,000 or less.

For example, when the number-average molecular weight of the second polyolefin resin is 300,000 or more, the number-average molecular weight of the first polyolefin resin may be 150,000 or more but less than 300,000. When the number-average molecular weight of the second polyolefin resin is 350,000 or more, the number-average molecular weight of the first polyolefin resin may be 150,000 or more but less than 350,000.

It is to be noted that the number-average molecular weight of the first polyolefin resin is determined by gel permeation chromatography (GPC) based on polystyrene standards. When the first polyolefin resin used in the present invention is a homopolymer, the above numerical ranges of the number-average molecular weight can be respectively regarded as the numerical ranges of a weight-average molecular weight.

It is to be noted that the first polyolefin resin is a polyolefin that has no affinity for the polyamide resin described above and that has no reactive group capable of reacting with the polyamide resin, either. In this point, the first polyolefin resin is different from an olefin-based component as the modified elastomer described above.

The first polyolefin and the second polyolefin may be the same resin or different resins.

When the first polyolefin and the second polyolefin are different resins, for example, one of the first polyolefin and the second polyolefin is a block copolymerized polyolefin resin (e.g., a block copolymerized polypropylene resin) having an ethylene block as a dispersed phase, and the other is a non-block copolymerized polyolefin resin.

In this case, in terms of impact resistance, it is preferred that the first polyolefin be a block copolymerized polypropylene resin having an ethylene block as a dispersed phase, and the second polyolefin be a non-block copolymerized polyolefin resin. Further, the non-block copolymerized polyolefin resin is preferably a homopolypropylene resin.

It is to be noted that the non-block copolymerized polyolefin resin herein refers to a copolymerized polyolefin resin not having an ethylene block as a dispersed phase. Therefore, in this description, a block copolymerized polyolefin resin not having an ethylene block as a dispersed phase is included in the non-block copolymerized polyolefin resin.

In the above-described case where the first polyolefin is a block copolymerized polypropylene resin having an ethylene block as a dispersed phase and the second polyolefin is a non-block copolymerized polypropylene resin, the thermoplastic resin composition obtained by using the modifier and the molded body have a continuous phase (A') formed of homopolypropylene constituting the first polypropylene resin and the second polypropylene resin, a dispersed phase (B) dispersed in the continuous phase (A') and containing the polyamide resin and the modified elastomer, and a dispersed phase (B') composed of the ethylene block constituting the first polypropylene resin. In addition, at least part of the ethylene block is aggregated at the interface between the continuous phase (A') and the dispersed phase (B). This allows the thermoplastic resin composition and the molded body to offer particularly excellent impact resistance.

(2) Other Components that may be Contained in Thermoplastic Resin Composition and Molded Body The thermoplastic resin composition obtained by using the modifier and the molded body may contain, in addition to the first polyolefin resin, the second polyolefin resin, the polyamide resin, and the modified elastomer, various additives such as another thermoplastic resin, a flame retardant, a flame retardant aid, a filler, a colorant, an antimicrobial agent, and an antistatic agent. These olefins may be used singly or in combination of two or more of them.

Examples of the other thermoplastic resin include polyester-based resins (polybutylene terephthalate, polyethylene terephthalate, polycarbonate, polybutylene succinate, polyethylene succinate, and polylactic acid). These olefins may be used singly or in combination of two or more of them.

Examples of the flame retardant include halogen-based flame retardants (halogenated aromatic compounds), phosphorus-based flame retardants (e.g., nitrogen-containing phosphate compounds, and phosphoric acid esters), nitrogen-based flame retardants (e.g., guanidine, triazine, melamine, and derivatives thereof), inorganic flame retardants (e.g., metal hydroxides), boron-based flame retardants, silicone-based flame retardants, sulfur-based flame retardants, and red phosphorus-based flame retardants. These olefins may be used singly or in combination of two or more of them.

Examples of the flame retardant aid include various antimony compounds, metal compounds containing zinc, metal compounds containing bismuth, magnesium hydroxide, and clayey silicate. These olefins may be used singly or in combination of two or more of them.

Examples of the filler include: glass components (e.g., glass fibers, glass beads, and glass flakes); silica; inorganic fibers (glass fibers, alumina fibers, and carbon fibers), graphite, silicate compounds (e.g., calcium silicate, aluminum silicate, kaolin, talc, and clay), metal oxides (e.g., iron oxide, titanium oxide, zinc oxide, antimony oxide, and alumina), carbonates and sulfates of metals such as calcium, magnesium, and zinc, and organic fibers (e.g., aromatic polyester fibers, aromatic polyamide fibers, fluororesin fibers, polyimide fibers, and vegetable fibers). These olefins may be used singly or in combination of two or more of them.

Examples of the colorant include pigments and dyes. These olefins may be used singly or in combination of two or more of them.

(3) Phase Structure of Thermoplastic Resin Composition and Molded Body

In the thermoplastic resin composition obtained by using the modifier and the molded body, the first polyolefin resin and the second polyolefin resin form a continuous phase (A'). That is, the modifier has a continuous phase (A) containing the second polyolefin, but in the thermoplastic resin composition and the molded body, the first polyolefin and the continuous phase (A) are integrated to form a continuous phase (A').

On the other hand, the polyamide resin and the modified elastomer usually form a dispersed phase (B) as when present in the modifier. That is, the dispersed phase (B) is dispersed in the continuous phase (A'). This phase structure can be obtained by molding a thermoplastic resin that is a mixture of the modifier and the first polyolefin resin.

Further, in the thermoplastic resin composition obtained by using the modifier and the molded body, the polyamide resin constituting the disperse phase (B), which is composed of the polyamide resin and the modified elastomer, forms a continuous phase ($B_1$) in the dispersed phase (B), and at least the modified elastomer out of the polyamide resin and the modified elastomer can form a fine dispersed phase ($B_2$) in the dispersed phase (B). When having such a multiple phase structure in which the fine dispersed phase ($B_2$) is further contained in the dispersed phase (B), the thermoplastic resin composition and the molded body can have more excellent impact resistance. When already formed in the modifier, the multiple phase structure is basically maintained also in the thermoplastic resin composition obtained by using the modifier and the molded body.

Further, when the first polyolefin resin is a block copolymerized polyolefin resin having an ethylene block as a dispersed phase, at least part of the ethylene block constituting the block copolymerized polyolefin resin can be aggregated at the interface between the continuous phase (A') and the dispersed phase (B) in the thermoplastic resin composition obtained by using the modifier and the molded body. Also when having such a phase structure, the thermoplastic resin composition and the molded body can have more excellent impact resistance.

The size of the dispersed phase (B) contained in the continuous phase (A') of the thermoplastic resin composition obtained by using the modifier and the molded body is not particularly limited, but is usually the same as that of the dispersed phase (B) in the modifier described above.

Further, when the fine dispersed phase ($B_2$) is contained in the dispersed phase (B) of the thermoplastic resin composition obtained by using the modifier and the molded body, the size of the fine dispersed phase ($B_2$) is not particularly limited, but is usually the same as that of the fine dispersed phase ($B_2$) in the modifier described above.

(4) Blending Ratio

When the total of the continuous phase (A') and the dispersed phase (B) in the thermoplastic resin composition obtained by using the modifier and the molded body is taken as 100% by mass, the content of the dispersed phase (B) is 80% by mass or less. More specifically, when the total amount of the first polyolefin resin and the second polyolefin resin is defined as $W_A$, the total amount of the polyamide resin and the modified elastomer is defined as $W_B$, and the total of the $W_A$ and $W_B$ is taken as 100% by mass, the ratio of $W_B$ is usually 80% by mass or less (usually 0.5% by mass or more). When the ratio of $W_B$ is within the above range, excellent impact resistance and excellent balance between rigidity and moldability can be achieved. The ratio may be 1% by mass or more but 78% by mass or less, further may be 3% by mass or more but 77% by mass or less, further may be 5% by mass or more but 76% by mass or less, further may be 8% by mass or more but 75% by mass or less, further may be 10% by mass or more but 72% by mass or less, further may be 15% by mass or more but 67% by mass or less, further may be 25% by mass or more but 63% by mass or less.

The content of each of the first polyolefin resin and the second polyolefin resin is not particularly limited, but when the total of the first polyolefin resin and the second polyolefin resin is taken as 100% by mass, the content of the second polyolefin resin may be 80% by mass or less. The content of the second polyolefin resin further may be 1% by mass or more but 60% by mass or less, further may be 3% by mass or more but 40% by mass or less, further may be 5% by mass or more but 30% by mass or less, further may be 10% by mass or more but 25% by mass or less.

The specific gravity of the thermoplastic resin composition obtained by using the modifier and the molded body is not particularly limited, but may usually be 1.05 or less. When the thermoplastic resin composition and the molded body have a polyamide content of 1% by mass or more but 40% by mass or less, a propylene resin content of 50% by mass or more but 75% by mass or less, and a maleic anhydride-modified olefin-based thermoplastic elastomer content of 5% by mass or more but 30% by mass or less, the specific gravity may particularly be 0.89 or more but 1.05 or less, and may more particularly be 0.92 or more but 0.98 or less. That is, even when having a specific gravity equivalent to those of a polyethylene resin and a polypropylene resin, the thermoplastic resin composition and the molded body can offer much more excellent impact resistance and rigidity than these resins.

(5) Types of Molded Bodies

The shape, size, thickness, etc. of the molded body are not particularly limited, and the application of the molded body is not particularly limited, either.

The molded body is used as various articles for use in vehicles such as automobiles, railway vehicles (general railway vehicles), aircraft fuselages (general fuselages), boats and ships/hulls (general hulls), and bicycles (general bicycles).

Among them, examples of articles for use in automobiles include exterior parts, interior parts, engine parts, and electrical parts. Specific examples of the exterior parts for automobiles include roof rails, fenders, fender liners, garnishes, bumpers, door panels, roof panels, hood panels, trunk lids, fuel lids, door mirror stays, spoilers, hood louvers, wheel covers, wheel caps, grill apron cover frames, lamp bezels, door handles (pull handles), door moldings, rear finishers, wipers, engine under covers, floor under covers, rocker moldings, cowl louvers, cowls (motorcycles), and films/sheets for automobile parts.

Examples of the interior parts for automobiles include: trim parts such as door trim base materials (FR, RR, BACK), pockets, arm rests, switch bases, decorative panels, ornament panels, EA materials, speaker grills, and quarter trim base materials; pillar garnishes; cowl side garnishes (cowl side trims); seat parts such as shields, back boards, dynamic dampers, and side air bag peripheral parts; ceilings; carpets; instrument panel parts such as center clusters, registers, center boxes (doors), glove doors, cup holders, and air bag peripheral parts; center consoles; overhead consoles; sun visor parts such as sun visors and sun visor brackets; deck boards (luggage boards) and under trays; package trays; high mount stop lamp covers; CRS covers; seat side garnishes; scuff plates; room lamps; assist grips; safety belt parts; register blades; washer levers; window regulator handles; knobs of window regulator handles; and passing light levers.

Examples of the engine parts for automobiles include alternator terminals, alternator connectors, IC regulators, potentiometer bases for light dimmers, exhaust gas valves, fuel pipes, cooling pipes, brake pipes, wiper pipes, exhaust pipes, intake pipes, hoses, tubes, air intake nozzle snorkels, intake manifolds, fuel pumps, engine cooling water joints, carburetor main bodies, carburetor spacers, exhaust gas sensors, cooling water sensors, oil temperature sensors, brake pad wear sensors, throttle position sensors, crankshaft position sensors, air flow meters, brake pad wear sensors, brake pistons, solenoid bobbins, engine oil filters, ignitor cases, and torque control levers.

Examples of the electrical parts for automobiles include battery peripheral parts, air conditioner thermostats, hot air flow control valves, brush holders for radiator motors, water pump impellers, turbine vanes, wiper motor-related parts, distributers, starter switches, starter relays, transmission wire harnesses, window washer nozzles, air conditioner panel switch boards, fuel-related electromagnetic valve coils, various connectors such as wire harness connectors, SMJ connectors, PCB connectors, door grommet connectors, and fuse connectors, horn terminals, electrical component insulating plates, step motor rotors, lamp sockets, lamp reflectors, lamp housings, cleaner cases, filter cases, and power trains.

Further, the molded body is used as various articles also in non-vehicle applications other than the above vehicles. Specific examples thereof include: industrial materials such as ropes, spun-bonded fabrics, polishing brushes, industrial brushes, filters, transport containers, trays, transport trolleys, and other general materials;

electronic parts such as connectors, coils, sensors, LED lamps, sockets, resistors, relay cases, miniature switches, coil bobbins, condensers, variable capacitor cases, optical pickups, resonators, various terminal boards, transformers, plugs, printed circuit boards, tuners, speakers, microphones, headphones, compact motors, compact transmission gears, magnetic head bases, power modules, semiconductors, liquid crystals, FDD carriages, FDD chassis, motor brush holders, parabolic antennas, and computer-related parts;

electrical devices such as power generators, electric motors, electric transformers, current transformers, voltage regulators, rectifiers, inverters, relays, power contacts, switches, breakers, knife switches, multipole rods, electrical part cabinets, and films for electrical devices:

industrial robot bodies, nursing-care robot bodies, and drone (flying objects operated by remote control, flying objects capable of autonomously flying) bodies;

home appliances and office equipment such as VTR parts, television parts, irons, hair dryers, rice cooker parts, microwave oven parts, acoustic parts, audio/LD parts, CD/DVD parts, lighting parts, refrigerator parts, washing machine parts, air conditioner parts, typewriter/word processor parts, office computer parts, PCs, game machines, tablet terminals, mobile phones, smart phones, telephones and related parts, facsimile parts, copy machine parts, cleaning/washing devices, motor parts, and films/sheets for home appliances;

optical and precision instruments such as cameras, watches, microscopes, binoculars, telescopes, and eyeglasses;

everyday items and housewares such as storage cases (e.g., food trays, storage boxes, storage trays, attache cases, suit cases, helmets, water bottles, and bottles), toiletries, writing tools, stationery, book-slides, skin-care tools, utensils, tableware, laundry tools, cleaning tools, clothes hangers, films for household goods, food containers, and lids (e.g., lids for glass bottles);

entertainment items such as toys;

machine tools/general machinery/machine parts such as mowing machine bodies and covers, power tool bodies and covers, and various clips;

sporting goods such as tennis racket strings, ski plates/boards, protectors (baseball, soccer, motor sports), shoes, shoes soles (shoes soles, soles for sport shoes), and outdoor/climbing tools;

furniture-related items such as costume cases, tables, chairs, shoes boxes, kitchen utensils, toilet room goods, bathroom goods, curtains, bedding covers, and blankets;

housing and civil engineering-related articles such as interior and exterior walls/roofs, heat insulating materials, doors/door-related parts, window material-related parts, floor material-related parts, seismic isolating/damping parts, shutters, gutters, water supply and sewage-related parts (lifeline-related parts), parking garages, gas and power supply-related parts (lifeline-related parts), civil engineering-related parts, films/sheets for civil engineering and housing, traffic signals, road signs, pylons, center poles, guardrails (guard wires), and equipment for construction works;

medical supplies such as mouthpieces, medical equipment, medical containers, and medical films;

clothing items such as uniforms, working wear, sportswear, shirts, underwear (including socks), pants, shoes, and outfits for cold weather; and agriculture-, forestry-, and fishery-related items such as films for agriculture, plastic green houses, fishing nets, floats, agricultural machines, farming tools, flower pots (planters), fishing gear, marine culture-related tools, and tools for forestry industry.

Other examples of the molded body include pellets formed into various shapes.

[3] Method for Producing Modifier

A method for producing the modifier according to the present invention includes a melt-kneading step in which the second polyolefin resin and a melt-kneaded product of the polyamide resin and the modified elastomer are melt-kneaded.

The above "melt-kneaded product" is a thermoplastic resin composition obtained by melt-kneading the polyamide resin and the modified elastomer. Examples of each of the polyamide resin and the modified elastomer that can be used at this time are the same as those mentioned above.

The melt-kneaded product can be obtained by melt-kneading the polyamide resin and the modified elastomer so that when the total of both the polyamide resin and the modified elastomer is taken as 100% by mass, the blending ratio of the polyamide resin is 10% by mass or more but 80% by mass or less. This makes it possible, when the melt-kneaded product and the second polyolefin resin are mixed, to obtain a modifier in which the polyamide resin is dispersed in the second polyolefin resin. More specifically, the modifier can have a phase structure in which a continuous phase (A) containing the second polyolefin resin is formed, and a dispersed phase (B) containing the polyamide resin and the modified elastomer is dispersed in the continuous phase (A). Further, a multiple phase structure can be obtained in which the dispersed phase (B) has a continuous phase ($B_1$) containing the polyamide resin and a fine dispersed phase ($B_2$) dispersed in the continuous phase ($B_1$) and containing the modified elastomer.

The content of the polyamide resin is preferably 12% by mass or more but 78% by mass or less, more preferably 14% by mass or more but 75% by mass or less, even more preferably 25% by mass or more but 73% by mass or less, even more preferably 30% by mass or more but 71% by mass or less, particularly preferably 34% by mass or more but 68% by mass or less, more particularly preferably 40% by mass or more but 64% by mass or less. When the ratio of the polyamide resin is within the above range, a modifier can be obtained in which the polyamide resin is dispersed as smaller particles in the second polyolefin resin.

It is to be noted that from the viewpoint of obtaining a polyamide resin rich-type modifier whose polyamide resin content is 50% by mass or more, the content of the polyamide resin may be 50% by mass or more but 80% by mass or less when the total of the polyamide resin and the modified elastomer is taken as 100% by mass.

When the polyamide is polyamide 6 and the total of the polyamide resin and the modified elastomer is taken as 100% by mass, the blending ratio of the polyamide resin in the melt-kneaded product may be 10% by mass or more but 80% by mass or less. The ratio of the polyamide resin is preferably 12% by mass or more but 68% by mass or less, more preferably 14% by mass or more but 65% by mass or less, even more preferably 16% by mass or more but 63% by mass or less, even more preferably 18% by mass or more but 61% by mass or less, particularly preferably 20% by mass or more but 58% by mass or less, more particularly preferably 25% by mass or more but 54% by mass or less. When the ratio of the polyamide resin is within the above range, a modifier can be obtained in which the polyamide resin is dispersed as smaller particles in the second polyolefin resin.

A kneading method used to obtain the melt-kneaded product is not particularly limited. The kneaded product can be obtained by, for example, using a kneading device such as an extruder (e.g., a single screw extruder or a twin-screw extruder), a kneader, or a mixer (e.g., a high-speed flow mixer, a paddle mixer, or a ribbon mixer). These devices may be used singly or in combination of two or more of them. When two or more devices are used, they may be operated either continuously or batch-wise. Further, all the components of the melt-kneaded product may be mixed at a time or may be mixed by adding them in several batches (multistage addition).

The kneading temperature at which the melt-kneaded product is obtained is not particularly limited as long as melt-kneading can be performed, and the kneading temperature can be appropriately adjusted according to the type of each of the components. In particular, it is preferred that all the resins be kneaded in a molten state. More specifically, the kneading temperature may be 190 to 350° C., but is preferably 200 to 330° C., more preferably 205 to 310° C.

The above "melt-kneading step" is a step in which the second polyolefin resin and the melt-kneaded product are melt-kneaded. Examples of the second polyolefin resin that can be used at this time include those as mentioned above, and the second polyolefin resin can be blended in such a manner as described above.

A kneading method used to obtain the modifier is not particularly limited, and the same device, operation mode, and kneading temperature as described above with reference to a case where the melt-kneaded product is obtained may be used.

[4] Method for Using Modifier

A method for using the modifier according to the present invention includes mixing the modifier with the first polyolefin resin in an amount of 0.5 parts by mass or more but 80 parts by mass or less per 100 parts by mass of the first polyolefin resin.

A molded body raw material obtained by mixing the first polyolefin resin and the modifier in such a manner as described above is usually molded to obtain a molded body. This makes it possible to obtain a molded body having excellent impact resistance while reducing the heat history load of the first polyolefin resin. Particularly, the above-described blending ratio of the modifier with the first polyolefin resin may be 1 part by mass or more but 70 parts by mass or less, further may be 2 parts by mass or more but 60 parts by mass or less, further may be 3 parts by mass or more but 50 parts by mass or less, further may be 4 parts by mass or more but 40 parts by mass or less, and further may be 5 parts by mass or more but 35 parts by mass or less.

A method for mixing the first polyolefin resin and the modifier and a means for performing the method are not particularly limited. For example, the molded body raw material can be obtained by dry-blending using a blender.

Further, as described above, the molded body obtained by using the modifier may contain, in addition to the first polyolefin resin, the second polyolefin resin, the polyamide resin, and the modified elastomer, various additives such as a flame retardant, a flame retardant aid, a filler, a colorant, an antimicrobial agent, and an antistatic agent. When these additives are added to the molded body, the modifier can be used as a carrier that carries these additives. Further, the modifier can be used also as a carrier for blending a foaming agent It is to be noted that a molding method of the molded body raw material is not particularly limited. Examples of the molding method include injection molding, extrusion molding (sheet extrusion, profile extrusion), T-die molding, blow molding, injection blow molding, inflation molding, blow molding, vacuum molding, compression molding, press molding, stamping molding, and transfer molding. These olefins may be used singly or in combination of two or more of them.

It is to be noted that a molded body can be obtained by molding the molded body raw material, which has a continuous phase (A') containing a first polyolefin resin and a second polyolefin resin and a dispersed phase (B) dispersed in the continuous phase (A) and containing a polyamide resin and a modified elastomer, wherein the dispersed phase (B) is composed of a melt-kneaded product of the polyamide resin and the modified elastomer having a reactive group that reacts with the polyamide resin, and wherein when a total of the continuous phase (A') and the dispersed phase (B) is taken as 100% by mass, a content of the dispersed phase (B) is 70% by mass or less, and when a total of the first polyolefin resin and the second polyolefin resin is taken as 100% by mass, a content of the second polyolefin resin is 70% by mass or less, and wherein a heat history of the first polyolefin resin is lower than that of the second polyolefin resin. That is, a molded body can be obtained by molding, as the above-describe thermoplastic resin composition, a mixture of the first polyolefin resin and the modifier containing the second polyolefin resin, the polyamide resin, and the modified elastomer.

This molded body obtained by using the method described above can offer significantly excellent impact resistance while well maintaining rigidity that the first polyolefin resin originally has. Further, a molded body in which the heat history of the first polyolefin resin has been reduced can be obtained by using, as the first polyolefin resin, part of a polyolefin to be used. That is, a molded body can be obtained by molding, as the above-describe thermoplastic resin composition, a mixture of the first polyolefin resin and the modifier containing the second polyolefin resin, the polyamide resin, and the modified elastomer.

However, at the time of filing the present application, it is impossible to directly specify the property that the heat history of the first polyolefin resin is lower than that of the second polyolefin resin. Even if possible, it takes too much cost and time to specify such a property even with current analytical techniques, and therefore there are unpractical circumstances in light of the necessity of promptness etc. due to the nature of patent application.

[5] Carrier for Additive

A carrier for an additive according to the present invention is a carrier for an additive for use in adding an additive to a first polyolefin resin, the carrier including:

a continuous phase (A) containing a second polyolefin resin; and a dispersed phase (B) dispersed in the continuous phase (A) and containing a polyamide resin and a modified elastomer, wherein the dispersed phase (B) is composed of a melt-kneaded product of the polyamide resin and the modified elastomer, the modified elastomer is an elastomer having a reactive group that reacts with the polyamide resin, the elastomer is an olefin-based thermoplastic elastomer having, as a skeleton, a copolymer of ethylene or propylene and an α-olefin having 3 to 8 carbon atoms or a styrene-based thermoplastic elastomer having a styrene skeleton, and when a total of the continuous phase (A) and the dispersed phase (B) is taken as 100% by mass, a content of the dispersed phase (B) is 80% by mass or less.

The components of the above-described modifier can directly be used as components of the carrier for an additive, and the carrier for an additive can be obtained by blending these components in the same manner as described above with reference to the modifier.

When a molded body is obtained, various additives may be blended with a base resin (in the present invention, the first polyolefin). Examples of the additives include a flame retardant, a flame retardant aid, a filler, a colorant, an antimicrobial agent, an antistatic agent, and a foaming agent. The details of the additives described above with reference to the modifier can directly be applied to these additives.

The amount of an additive to be blended is usually smaller than that of a base resin. Therefore, for the purpose of improving handleability and more accurately weighing the amount of an additive to be blended, an additive may be carried by a carrier (carrier for additive) so as to be blended with a base resin together with the carrier. When the base resin is, for example, a polyolefin resin, the carrier for an additive to be used is preferably a resin compatible with the polyolefin resin. When the base resin is a polyolefin resin, addition of the carrier for an additive according to the present invention is effective at imparting high impact resistance even when the amount of the carrier for an additive added is small.

It is to be noted that an additive to be used can be carried by the carrier for an additive by appropriately blending them depending on the type or shape of the additive.

EXAMPLES

Hereinbelow, the present invention will be specifically described with reference to examples.

[1-1] Production of Molded Bodies for Evaluation (Examples 1 to 5 and Comparative Examples 1 to 3) <1>Modifier A modifier was prepared by the following procedure. The modifier contained 55% by mass of a second polyolefin, 15% by mass of a polyamide resin, and 30% by mass of a modified elastomer per 100% by mass of its total mass.

(1) Preparation of Melt-Kneaded Product

Pellets of the following polyamide resin and pellets of the following modified elastomer were dry-blended, then fed into a twin-screw melt-kneading extruder (manufactured by TECHNOVEL CORPORATION, screw diameter: 15 mm, L/D=59), and melt-kneaded under conditions of a kneading temperature of 210° C., an extrusion speed of 2.0 kg/hr, and a screw rotation speed of 200 rpm. The thus obtained melt-kneaded product was pelletized by a pelletizer to obtain pellets of the melt-kneaded product.

Polyamide resin: polyamide 6 (No. 1), manufactured by BASF, product name: "Ultramid B3S", weight-average molecular weight: 18,000, melting point: 220° C.

Modified elastomer: maleic anhydride-modified ethylene-butene copolymer (modified EBR), manufactured by Mitsui Chemicals, Inc., product name: "TAFMER MH7020", MFR (230° C.)=1.5 g/10 min (2) Preparation of Modifier The pellets of the melt-kneaded product obtained in the above (1) and pellets of the following second polyolefin resin are dry-blended, fed into a twin-screw melt-kneading extruder (manufactured by TECHNOVEL CORPORATION, screw diameter: 15 mm, L/D=59), and mixed under conditions of a kneading temperature of 210° C., an extrusion speed of 2.0 kg/hr, and a screw rotation speed of 200 rpm, and the thus obtained mixture was pelletized by a pelletizer to obtain a modifier (as pellets).

Second polyolefin resin: polypropylene resin (No. 1), homopolymer, manufactured by Prime Polymer Co., Ltd., product name: "Prime Polypro F113G", number-average molecular weight: 520,000, melting point: 160° C., MFR: 3 g/10 min <2>Production of Molded Bodies of Examples 1 to 5

A molded body containing 80% by mass of a first polyolefin and 20% by mass of a modifier per 100% of its total mass (Example 1), a molded body containing 75% by mass of a first polyolefin and 25% by mass of a modifier per 100% of its total mass (Example 2), a molded body containing 70% by mass of a first polyolefin and 30% by mass of a modifier per 100% of its total mass (Example 3), a molded body containing 60% by mass of a first polyolefin and 40% by mass of a modifier per 100% of its total mass (Example 4), and a molded body containing 40% by mass of a first polyolefin and 60% by mass of a modifier per 100% of its total mass (Example 5) were each produced by the following procedure.

The modifier obtained in the above [1-1](2) and pellets of the following first polyolefin resin were dry-blended to obtain a molded body raw material. The obtained molded body raw material was fed into a hopper of an injection molding machine (manufactured by NISSEI PLASTIC INDUSTRIAL CO., LTD., 40-ton injection molding machine), and injection-molded under injection conditions of a set temperature of 210° C. and a mold temperature of 60° C. to obtain test specimens for measuring physical properties.

First polyolefin resin: block copolymerized polyolefin resin having an ethylene block as a dispersed phase, manufactured by SunAllomer Ltd., product name: "YS559N", melting point: 165° C.

<3>Production of Molded Bodies of Comparative Examples (1) Production of Molded Body of Comparative Example 1

The following polyolefin resin (which was the same as the first polyolefin resin used for the molded bodies of Examples) was fed into a hopper of an injection molding machine (manufactured by NISSEI PLASTIC INDUSTRIAL CO., LTD., 40-ton injection molding machine) and injection-molded under injection conditions of a set temperature of 210° C. and a mold temperature of 60° C. to obtain test specimens for measuring physical properties.

First polyolefin resin: block copolymerized polyolefin resin having an ethylene block as a dispersed phase, manufactured by SunAllomer Ltd., product name: "YS559N", melting point: 165° C.

(2) Production of Molded Bodies of Comparative Examples 2 and 3

Pellets of the following impact resistance-imparting agent conventionally used to impart impact resistance and pellets of the following polyolefin resin were dry-blended to obtain a molded body raw material, and the molded body raw material was fed into a hopper of an injection molding machine (manufactured by NISSEI PLASTIC INDUSTRIAL CO., LTD., 40-ton injection molding machine) and injection-molded under injection conditions of a set temperature of 210° C. and a mold temperature of 60° C. to obtain test specimens for measuring physical properties.

Polyolefin resin: block copolymerized polyolefin resin having an ethylene block as a dispersed phase, manufactured by SunAllomer Ltd., product name: "YS559N", melting point: 165° C.

Impact resistance-imparting agent: manufactured by Mitsui Chemicals, Inc., product name: "TAFMER DF810"

[1-2] Evaluations of Molded Bodies for Evaluation (1) Measurement of Charpy Impact Strength Measurement of Charpy impact strength was performed in accordance with JIS K7111-1 using each of the test specimens for evaluation of Examples 1 to 5 and Comparative Examples 1 to 3 obtained in the above [1-1]. The results of the measurement are shown in Table 1. It is to be noted that in the measurement of Charpy impact strength, impact strength was measured at a temperature of 23° C. by an edgewise test method using a test specimen having a notch (type A).

(2) Observation of Morphology

A sample cut out from each of the test specimens of Examples 1 to 5 that had been subjected to the measurement of Charpy impact strength described above in (1) was embedded in a resin. Then, the sample was trimmed and cut in a cross section using an ultramicrotome with a diamond knife and subjected to steam dyeing with a metal oxide. An ultrathin section sample was taken from the obtained cross section after dyeing and observed using a transmission electron microscope (TEM, manufactured by Hitachi High-Technologies Corporation, Model "HT7700") to observe a phase structure.

As a result, in Examples 1 to 5, as shown in the schematic diagram shown in FIG. 1, a continuous phase 1 [continuous phase (A')] containing the first polyolefin resin and the second polyolefin resin, a dispersed phase 2 [dispersed phase (B)] dispersed in the continuous phase (A') and containing the polyamide resin and the modified elastomer, a continuous phase 3 [continuous phase ($B_1$)] containing the polyamide resin, a fine dispersed phase 4 [fine dispersed phase ($B_2$)] dispersed in the continuous phase ($B_1$) and containing the modified elastomer, and an aggregate phase 5 [aggregate phase (D)] in which an ethylene block of the first polyolefin resin is aggregated at the interface between the continuous phase (A') and the dispersed phase (B) were observed. It is to be noted that the aggregate phase (D)

contains not only the ethylene block of the first polyolefin resin but also the modified elastomer.

The results relating to the phase structure are shown also in Table 1.

(3) Measurement of Tensile Elastic Modulus

Measurement of tensile elastic modulus was performed in accordance with JIS K7161 using each of the test specimens for evaluation of Examples 1 to 5 and Comparative Examples 1 to 3 obtained in the above [1-1]. The results of the measurement are shown in Table 1.

into a twin-screw melt-kneading extruder (manufactured by TECHNOVEL CORPORATION, screw diameter: 15 mm, L/D=59), and melt-kneaded under conditions of a kneading temperature of 210° C., an extrusion speed of 2.0 kg/hr, and a screw rotation speed of 200 rpm. The thus obtained melt-kneaded product was pelletized by a pelletizer to obtain pellets of the melt-kneaded product.

Polyamide resin: polyamide 6 (No. 2), manufactured by Ube Industries, Ltd., product name: "1010X1", weight-average molecular weight: 20,000, melting point: 215° C.

TABLE 1

|  |  |  | Examples | | | | | Comparative Examples | | |
| --- | --- | --- | --- | --- | --- | --- | --- | --- | --- | --- |
|  |  |  | 1 | 2 | 3 | 4 | 5 | 1 | 2 | 3 |
| First polyolefin (% by mass) | PP (block) | | 80 | 75 | 70 | 60 | 40 | 100 | 90 | 80 |
| Modifier (% by mass) | | | 20 | 25 | 30 | 40 | 60 | | | |
| Composition of modifier | Polyamide (% by mass) | PA6 (No.1) | 3 | 3.75 | 4.5 | 6 | 9 | — | | |
| | Modified elastomer (% by mass) | Maleic anhydride-modified EBR | 6 | 7.5 | 9 | 12 | 18 | | | |
| | Second polyolefin (% by mass) | PP (No.1) (homo) | 11 | 13.75 | 16.5 | 22 | 33 | | | |
| Total of polyolefins (% by mass) | | | 91 | 88.75 | 86.5 | 82 | 73 | 100 | 90 | 80 |
| Conventional impact resistance-imparting agent (% by mass) | | | | | — | | | — | 10 | 20 |
| Phase structure | Continuous phase (A') · Dispersed phase (B) | | | | Present | | | | Absent | |
| | Continuous phase (B$_1$) · Fine dispersed phase (B$_2$) | | | | Present | | | | Absent | |
| | Interfacial aggregation (D) | | | | Present | | | | Absent | |
| Charpy impact strength (kJ/m$^2$) | | | 37 | 44 | 62 | 70 | 81 | 16 | 13 | 21 |
| Tensile elastic modulus (MPa) | | | 972 | 846 | 878 | 721 | 649 | 1050 | 938 | 809 |

[1-3] Effects

From the results shown in Table 1, it was confirmed that the molded bodies of Examples 1 to 5 obtained by using the modifier offered much higher Charpy impact strength than the molded body of Comparative Example 1 formed of the first polyolefin resin, and therefore had excellent impact resistance. Further, it was confirmed that a reduction in tensile elastic modulus caused by addition of the modifier was extremely small so that rigidity was well maintained.

Further, the above effect obtained by using the modifier was apparent also from the comparison with the results of Comparative Examples 2 and 3 using the conventional additive.

Further, as described above, from the result shown in FIG. 1, it can be seen that a continuous phase 1 [continuous phase (A')] and a dispersed phase 2 [dispersed phase (B)] are formed in the molded body obtained by using the modifier. Further, it can be seen that a fine dispersed phase 4 [fine dispersed phase (B$_2$)] is formed in the dispersed phase (B). In addition, it can be seen that when a block copolymerized polyolefin resin having an ethylene block as a dispersed phase is used as the first polyolefin resin, at least part of the ethylene block (EPR) is aggregated at the interface between the continuous phase (A') and the dispersed phase (B) (see aggregate phase 5). It is considered that such aggregation leads to more excellent impact resistance.

[2-1] Production of Molded Bodies for Evaluation (Examples 6 to 9)

<1>Modifier

A modifier for use in Examples 6 to 9 was prepared by the following procedure. The modifier contained 55% by mass of a second polyolefin, 15% by mass of a polyamide resin, and 30% by mass of a modified elastomer per 100% of its total mass.

(1) Preparation of Melt-Kneaded Product

Pellets of the following polyamide resin and pellets of the following modified elastomer were dry-blended, then fed Modified elastomer: maleic anhydride-modified ethylene-butene copolymer (modified EBR), manufactured by Mitsui Chemicals, Inc., product name: "TAFMER MH7020", MFR (230° C.)=1.5 g/10 min (2) Preparation of Modifier The pellets of the melt-kneaded product obtained in the above (1) and pellets of the following second polyolefin resin are dry-blended, fed into a twin-screw melt-kneading extruder (manufactured by TECHNOVEL CORPORATION, screw diameter: 15 mm, L/D=59), and mixed under conditions of a kneading temperature of 210° C., an extrusion speed of 2.0 kg/hr, and a screw rotation speed of 200 rpm, and the thus obtained mixture was pelletized by a pelletizer to obtain a modifier (as pellets).

Second polyolefin resin: polypropylene resin (No. 1), homopolymer, manufactured by Prime Polymer Co., Ltd., product name: "Prime Polypro F113G", number-average molecular weight: 520,000, melting point: 160° C., MFR: 3 g/10 min <2>Production of Molded Bodies of Examples 6 to 9

A molded body containing 80% by mass of a first polyolefin and 20% by mass of a modifier per 100% of its total mass (Example 6), a molded body containing 60% by mass of a first polyolefin and 40% by mass of a modifier per 100% of its total mass (Example 7), a molded body containing 40% by mass of a first polyolefin and 60% by mass of a modifier per 100% of its total mass (Example 8), and a molded body containing 20% by mass of a first polyolefin and 80% by mass of a modifier per 100% of its total mass (Example 9) were each produced by the following procedure.

The modifier obtained in the above [2-1](2) and pellets of the following first polyolefin resin were dry-blended to obtain a molded body raw material. The obtained molded body raw material was fed into a hopper of an injection molding machine (manufactured by NISSEI PLASTIC INDUSTRIAL CO., LTD., 40-ton injection molding machine), and injection-molded under injection conditions of a set temperature of 210° C. and a mold temperature of 60° C. to obtain test specimens for measuring physical properties.

First polyolefin resin: block copolymerized polyolefin resin having an ethylene block as a dispersed phase, manufactured by SunAllomer Ltd., product name: "YS559N", melting point: 165° C.

[2-2] Production of Molded Bodies for Evaluation (Examples 10 to 13)

<1>Modifier

A modifier for use in Examples 10 to 13 was prepared by the following procedure. The modifier contained 55% by mass of a second polyolefin, 25% by mass of a polyamide resin, and 20% by mass of a modified elastomer per 100% of its total mass.

(1) Preparation of Melt-Kneaded Product

Pellets of the following polyamide resin and pellets of the following modified elastomer were dry-blended, then fed into a twin-screw melt-kneading extruder (manufactured by TECHNOVEL CORPORATION, screw diameter: 15 mm, L/D=59), and melt-kneaded under conditions of a kneading temperature of 210° C., an extrusion speed of 2.0 kg/hr, and a screw rotation speed of 200 rpm. The thus obtained melt-kneaded product was pelletized by a pelletizer to obtain pellets of the melt-kneaded product.

Polyamide resin: polyamide 11, manufactured by Arkema, product name: "Rilsan BMN O", weight-average molecular weight: 18,000, melting point: 189° C.

Modified elastomer: maleic anhydride-modified ethylene-butene copolymer (modified EBR), manufactured by Mitsui Chemicals, Inc., product name: "TAFMER MH7020", MFR (230° C.)=1.5 g/10 min (2) Preparation of Modifier The pellets of the melt-kneaded product obtained in the above (1) and pellets of the following second polyolefin resin are dry-blended, fed into a twin-screw melt-kneading extruder (manufactured by TECHNOVEL CORPORATION, screw diameter: 15 mm, L/D=59), and mixed under conditions of a kneading temperature of 210° C., an extrusion speed of 2.0 kg/hr, and a screw rotation speed of 200 rpm, and the thus obtained mixture was pelletized by a pelletizer to obtain a modifier (as pellets).

Second polyolefin resin: polypropylene resin (No. 2), homopolymer, manufactured by Japan Polypropylene Corporation, product name: "NOVATEC MA1B", number-average molecular weight: 312,000, melting point: 165° C., MFR: 21 g/10 min <2>Production of Molded Bodies of Examples 10 to 13

A molded body containing 90% by mass of a first polyolefin and 10% by mass of a modifier per 100% of its total mass (Example 10), a molded body containing 80% by mass of a first polyolefin and 20% by mass of a modifier per 100% of its total mass (Example 11), a molded body containing 70% by mass of a first polyolefin and 30% by mass of a modifier per 100% of its total mass (Example 12), and a molded body containing 60% by mass of a first polyolefin resin and 40% by mass of a modifier per 100% of its total mass (Example 13) were each produced by the following procedure.

The modifier obtained in the above [2-2](2) and pellets of the following first polyolefin resin were dry-blended to obtain a molded body raw material. The obtained molded body raw material was fed into a hopper of an injection molding machine (manufactured by NISSEI PLASTIC INDUSTRIAL CO., LTD., 40-ton injection molding machine), and injection-molded under injection conditions of a set temperature of 210° C. and a mold temperature of 60° C. to obtain test specimens for measuring physical properties.

First polyolefin resin: block copolymerized polyolefin resin having an ethylene block as a dispersed phase, manufactured by SunAllomer Ltd., product name: "YS559N", melting point: 165° C.

Figure 2:
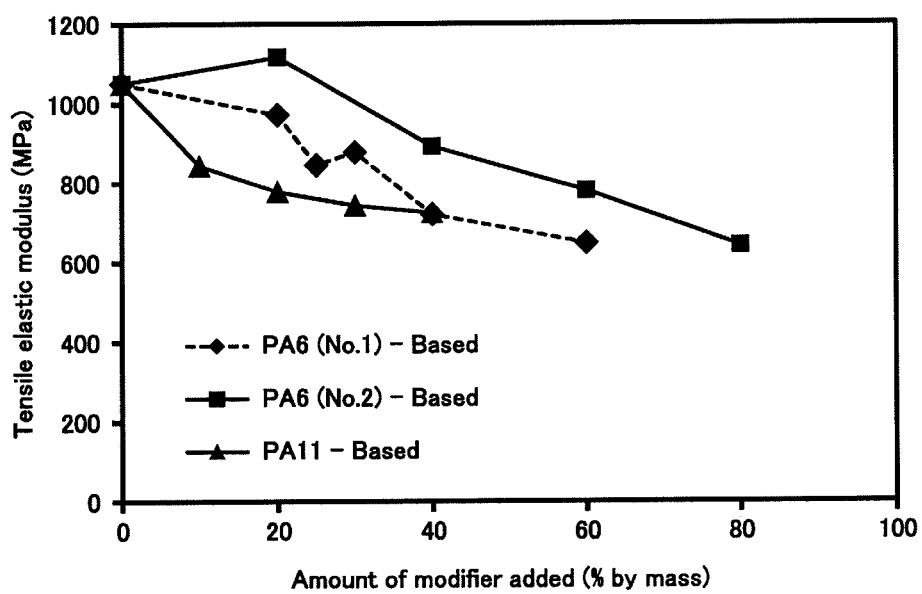
FIG. 2 is a graph showing a correlation between the tensile elastic modulus and the amount of a modifier added of each of the test specimens for evaluation of Examples [PA6 (No. 1)-based, PA6 (No. 2)-based, and PA 11-based].

[2-3] Evaluations of Molded Bodies for Evaluation (1) Measurement of Tensile Elastic Modulus Measurement of tensile elastic modulus was performed in accordance with JIS K7161 using each of the test specimens for evaluation of Examples 6 to 13 obtained in the above [2-1] and [2-2]. The results of the measurement are shown in Table 2. Further, a graph is shown in FIG. 2, which shows a correlation between the tensile elastic modulus and the amount of a modifier added of each of the test specimens for evaluation of Examples 1 to 5 [PA6 (No. 1)-based modifier], Examples 6 to 9 [PA6 (No. 2)-based modifier], and Examples 10 to 13 [PA11-based modifier].

(2) Observation of Morphology

A sample cut out from each of the test specimens of Examples 6 to 13 that had been subjected to the measurement of tensile elastic modulus described above in (1) was embedded in a resin. Then, the sample was trimmed and cut in a cross section using an ultramicrotome with a diamond knife and subjected to steam dyeing with a metal oxide. An ultrathin section sample was taken from the obtained cross section after dyeing and observed using a transmission electron microscope (TEM, manufactured by Hitachi High-Technologies Corporation, Model "HT7700") to observe a phase structure. The results of the measurement are shown in Table 2.

TABLE 2

| | | | Examples | | | | | | | |
|---|---|---|---|---|---|---|---|---|---|---|
| | | | 6 | 7 | 8 | 9 | 10 | 11 | 12 | 13 |
| First polyolefin (% by mass) | PP (block) | | 80 | 60 | 40 | 20 | 90 | 80 | 70 | 60 |
| Modifier (% by mass) | | | 20 | 40 | 60 | 80 | 10 | 20 | 30 | 40 |
| Composition of modifier | Polyamide (% by mass) | PA6 (No.2) | 3 | 6 | 9 | 12 | — | — | — | — |
| | | PA11 | — | — | — | — | 2.5 | 5 | 7.5 | 10 |
| | Modified elastomer (% by mass) | Maleic anhydride-modified EBR | 6 | 12 | 18 | 24 | 2 | 4 | 6 | 8 |
| | Second polyolefin (% by mass) | PP (No.1) (homo) | 11 | 22 | 33 | 44 | — | — | — | — |
| | | PP (No.2) (homo) | — | — | — | — | 5.5 | 11 | 16.5 | 22 |

TABLE 2-continued

| | Examples | | | | | | | |
|---|---|---|---|---|---|---|---|---|
| | 6 | 7 | 8 | 9 | 10 | 11 | 12 | 13 |
| Total of polyolefins (% by mass) | 91 | 82 | 73 | 64 | 95.5 | 91 | 86.5 | 82 |
| Phase structure — Continuous phase (A') · Dispersed phase (B) | | | | | Present | | | |
| Phase structure — Continuous phase (B₁) · Fine dispersed phase (B₂) | | | | | Present | | | |
| Phase structure — Interfacial aggregation (D) | | | | | Present | | | |
| Tensile elastic modulus (MPa) | 1117 | 892 | 781 | 642 | 844 | 779 | 744 | 725 |

[2-4] Effects

From the results shown in Table 2, it was confirmed that also in the case of the molded bodies of Examples 6 to 13 obtained by adding the modifier using a polyamide different from that used in the above Examples 1 to 5, a reduction in tensile elastic modulus determined by comparison with Comparative Example 1 was extremely small as in the case of the above Examples 1 to 5, and therefore rigidity was well maintained.

Further, from the results shown in FIG. 2, it was also confirmed that the molded bodies obtained by using the modifier containing PA6 as a polyamide resin [PA6 (No. 1)-based (Examples 1 to 5), PA6 (No. 2)-based (Examples 6 to 9)] maintained higher rigidity than the molded bodies obtained by using the modifier containing PA 11 as a polyamide resin [PA11-based (Examples 10 to 13)]. It is to be noted that this tendency was more significant when the amount of the modifier added was smaller.

This result revealed that the modifier using polyamide 6 as a polyamide can offer performance comparable to or higher than that of the modifier using polyamide 11 even when the content of the polyamide is relatively smaller. Further, it was revealed that the molded body obtained by using the modifier using polyamide 6 as a polyamide can offer performance (especially, tensile elastic modulus) comparable to or higher than that of the molded body obtained by using the modifier using polyamide 11 even when the amount of the modifier added is smaller.

It is to be noted that the present invention is not limited to the specific examples described above, and various modifications may be made to the examples within the scope of the present invention depending on the purpose or intended use.

More specifically, for example, in the above examples, molded bodies were obtained by molding molded body raw materials obtained by dry-blending pellets of the modifier and pellets of the first polyolefin resin, but pellets obtained by melt-kneading pellets of the modifier and pellets of the first polyolefin resin may, of course, be used as a molded body raw material.

The above-described examples are for illustrative purposes only, and shall not be construed as limiting the present invention. Although the present invention has been described with reference to exemplary embodiments, it is understood that the words used in the description and drawings of the present invention are explanatory and illustrative rather than restrictive. As described in detail herein, modifications may be made to the embodiments within the scope of the appended claims without departing from the scope and spirit of the present invention. Although the present invention has been described in detail with reference to particular structures, materials, and examples, the present invention is not intended to be limited to the particulars disclosed herein, rather the present invention extends to all the functionally-equivalent structures, methods, and uses within the scope of the appended claims.

REFERENCE SIGNS LIST

1; Continuous phase (A')
2; Dispersed phase (B)
3; Continuous phase (B₁)
4; Fine dispersed phase (B₂)
5; Aggregate phase (D)

The invention claimed is:

1. A method of combining a modifier with a polyolefin comprising:
   mixing the modifier with a first polyolefin resin in an amount of 0.5 parts by mass or more but 80 parts by mass or less per 100 parts by mass of the first polyolefin resin, wherein
   the modifier is capable of being added to the first polyolefin resin to obtain a molded body having improved impact resistance, and wherein the modifier comprises:
   a continuous phase (A) containing a second polyolefin resin; and a dispersed phase (B) dispersed in the continuous phase (A) and containing a polyamide resin and a modified elastomer, wherein
   the dispersed phase (B) is composed of a melt-kneaded product of the polyamide resin and the modified elastomer,
   the modified elastomer is an elastomer having a reactive group that reacts with the polyamide resin,
   the elastomer is an olefin-based thermoplastic elastomer having, as a skeleton, a copolymer of ethylene and a 3-8-carbon α-olefin, a copolymer of propylene and a 4-8-carbon α-olefin, or a styrene-based thermoplastic elastomer having a styrene skeleton, and
   when a total of the continuous phase (A) and the dispersed phase (B) is taken as 100% by mass, a content of the dispersed phase (B) is 80% by mass or less.

2. A carrier for an additive for adding an additive to a first polyolefin resin, the carrier comprising:
   a continuous phase (A) containing a second polyolefin resin; and a dispersed phase (B) dispersed in the continuous phase (A) and containing a polyamide resin and a modified elastomer, wherein
   the dispersed phase (B) is composed of a melt-kneaded product of the polyamide resin and the modified elastomer,
   the modified elastomer is an elastomer having a reactive group that reacts with the polyamide resin,
   the elastomer is an olefin-based thermoplastic elastomer having, as a skeleton, a copolymer of ethylene and a 3-8-carbon α-olefin, a copolymer of propylene and a 4-8-carbon α-olefin, or a styrene-based thermoplastic elastomer having a styrene skeleton, when a total of the continuous phase (A) and the dispersed phase (B) is taken as 100% by mass, a content of the dispersed phase (B) is 80% by mass or less, wherein the first polyolefin resin is a block copolymerized polyolefin resin having an ethylene block as a dispersed phase, and the additive is at least one of a flame retardant, a flame retardant aid, a filler, a colorant, an antimicrobial agent, an antistatic agent, and a foaming agent.

3. The method according to claim 1, wherein when a total of the polyamide resin and the modified elastomer is taken as 100% by mass, a content of the polyamide resin is 10% by mass or more but 80% by mass or less.

4. The method according to claim 1, wherein the dispersed phase (B) has a continuous phase (B1) containing the polyamide resin and a fine dispersed phase (B2) dispersed in the continuous phase (B1) and containing the modified elastomer.

5. The method according to claim 1, wherein the polyamide resin is polyamide 6.

6. The method according to claim 5, wherein the second polyolefin resin has a number-average molecular weight of 300,000 or more.

7. The method according to claim 1, wherein the first polyolefin resin is a block copolymerized polyolefin resin having an ethylene block as a dispersed phase.

8. The carrier according to claim 2, wherein when a total of the polyamide resin and the modified elastomer is taken as 100% by mass, a content of the polyamide resin is 10% by mass or more but 80% by mass or less.

9. The carrier according to claim 2, wherein the dispersed phase (B) has a continuous phase (B1) containing the polyamide resin and a fine dispersed phase (B2) dispersed in the continuous phase (B1) and containing the modified elastomer.

10. The carrier according to claim 2, wherein the polyamide resin is polyamide 6.

11. The carrier according to claim 10, wherein the second polyolefin resin has a number-average molecular weight of 300,000 or more.

* * * * *